(12) United States Patent
Kim et al.

(10) Patent No.: US 6,950,624 B2
(45) Date of Patent: Sep. 27, 2005

(54) APPARATUS AND METHOD FOR PROVIDING TELEVISION BROADCASTING SERVICE IN A MOBILE COMMUNICATION SYSTEM

(75) Inventors: Byung-Hwan Kim, Seoul (KR); Yong-Hwan Lee, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 435 days.

(21) Appl. No.: 10/211,398

(22) Filed: Aug. 2, 2002

(65) Prior Publication Data

US 2003/0032389 A1 Feb. 13, 2003

(30) Foreign Application Priority Data

Aug. 7, 2001 (KR) .......................................... 2001-47416

(51) Int. Cl.⁷ ................................................. H04H 1/00
(52) U.S. Cl. .................... 455/3.01; 455/3.06; 455/66.1; 370/487
(58) Field of Search ............................... 455/3.01, 3.06, 455/66.1, 188.1, 344; 348/8; 725/9, 87, 86

(56) References Cited

U.S. PATENT DOCUMENTS

| | | | | |
|---|---|---|---|---|
| 5,583,853 A | * | 12/1996 | Giallorenzi et al. | 370/441 |
| 6,606,481 B1 | * | 8/2003 | Tegler et al. | 370/487 |
| 6,717,547 B2 | * | 4/2004 | Spilker et al. | 342/464 |
| 6,816,704 B1 | * | 11/2004 | Fukuda | 455/7 |
| 6,873,853 B2 | * | 3/2005 | Kim | 455/466 |
| 2002/0069419 A1 | * | 6/2002 | Raverdy et al. | 725/87 |
| 2002/0080161 A1 | * | 6/2002 | St. Maurice et al. | 345/719 |
| 2002/0138830 A1 | * | 9/2002 | Nagaoka et al. | 725/14 |
| 2002/0181549 A1 | * | 12/2002 | Linnartz et al. | 375/142 |
| 2003/0007556 A1 | * | 1/2003 | Oura et al. | 375/240.01 |
| 2003/0021271 A1 | * | 1/2003 | Leimer et al. | 370/390 |

* cited by examiner

Primary Examiner—Tilahun Gesesse
(74) Attorney, Agent, or Firm—Dilworth & Barrese LLP

(57) ABSTRACT

An apparatus and method for providing broadcasting service in a mobile communication system. A format converter transcodes video data received from video resources to a format suitable for the mobile communication system. A base station spreads the transcoded video data with a predetermined dedicated spreading code and broadcasts the spread video signal. A mobile station receives and despreads the broadcasting signal from the base station with the spreading code.

15 Claims, 12 Drawing Sheets

APPARATUS AND METHOD FOR PROVIDING TELEVISION BROADCASTING SERVICE IN A MOBILE COMMUNICATION SYSTEM

This application claims priority to an application entitled "Apparatus and Method for Providing Television Broadcasting Service in a Mobile Communication System" filed in the Korean Industrial Property Office on Aug. 7, 2001 and assigned Ser. No. 2001-47416, the contents of which are hereby incorporated by reference.

BACKGROUND OF THE INVENTION

1. Field of the Invention

The present invention relates generally to an apparatus and method for providing broadcasting service in a mobile communication system, and in particular, to an apparatus and method for providing television ("TV") broadcasting service in a mobile communication system.

2. Description of the Related Art

Communication technology has been developed so drastically that it is expected that there will be no distinction between wired communication and wireless communication all around the globe in the future. In particular, the future communication systems such as IMT-2000 are intended to offer a variety of information including audio and video information to users in real time and on a large scale.

In the current development stage of communications, cellular phones and Personal Communication System ("PCS") phones additionally provide wireless Internet access as well as text transmission, aside from conventional voice calls.

Meanwhile, research has been made on a digital TV system to maximize benefits that digital data may offer beyond real-time transmission of moving pictures in the form of digital data. Up to now, a great progress has been made in the process.

In particular, research and development on compression of video signals to digital data and real-time transmission of the digital data at high speed with good quality are showing favorable results. Therefore, many of the achievements will be put into practice for daily use. That is, transmission/reception of digital moving picture information is being carried out via terrestrial broadcasting systems and cable broadcasting systems.

However, existing mobile communication systems and digital TV systems presently fail to organically cooperate with each other, and therefore fail to maximize their advantages. In other words, they are confined to their own fields. For example, the digital TV systems provide high quality images and a variety of additional information only to digital TV sets though to Personal Computers ("PCs") via the Internet in some cases, and the key services of the mobile communication systems are typically limited to voice calls and text transmissions.

If a future mobile communication system enables digital moving picture information to be provided to mobile terminals, it will be done via supplemental channels ("SCHs") that have been proposed for packet data service. The SCHs are dedicated channels for communications between a base station ("BS") and a mobile station ("MS") on a one-to-one basis. Therefore, establishment of an SCH requires a procedure illustrated in FIG. 1.

Referring to FIG. 1, an MS receives an Overhead Message including parameters from a BS at initial system acquisition in step 101. Then, when a packet service is requested, the MS sends an Origination Message to the BS in step 103. The BS sends an Ack Order for the Origination Message in step 105 and an Extended Channel Assignment Message to assign a fundamental channel ("FCH") to the MS in step 107. In step 109, the MS and the BS set up traffic channels (i.e. FCHs). Then, the BS sends an Extended Supplemental Channel Message to the MS to assign an SCH in step 111. The FCH is used for voice call and the SCH, for packet communication. In step 113, the MS and the BS exchange packet data on established SCHs.

If a mobile communication service provider provides TV broadcasting service to users, this is broadcast free of charge in its literal sense. Therefore, when the TV broadcasting service is provided on existing SCHs, signaling overhead is generated during channel establishment and it is impossible to simultaneously provide the service to multiple users.

SUMMARY OF THE INVENTION

An object of the present invention is, therefore, to provide an apparatus and method for supporting broadcasting service in a mobile communication system.

Another object of the present invention is to provide an apparatus and method for providing broadcasting service to an MS with dedicated frequency assignment ("FA1") by a BS in a mobile communication system.

A further object of the present invention is to provide an apparatus and method for providing TV broadcasting service using a predetermined number of Walsh codes in a mobile communication system.

Still another object of the present invention is to provide an apparatus and method for alerting an MS to an incoming call via a quick paging channel during receiving TV broadcasting service, in a mobile communication system.

Yet another object of the present invention is to provide an apparatus and method for managing BSs that support broadcasting service on a zone basis and notifying an MS of information about the BSs by an Overhead Message in a mobile communication system.

Further another object of the present invention is to provide an apparatus and method for implementing a handoff that occurs during receiving a broadcasting channel ("BCH") in a mobile communication system.

To achieve the above and other objects, there are provided an apparatus and method for providing broadcasting service in a mobile communication system. A format converter transcodes video data received from video resources to a format suitable for the mobile communication system. A base station spreads the transcoded video data with a predetermined dedicated spreading code and broadcasts the spread video signal. A mobile station receives and despreads the broadcasting signal from the base station with the spreading code.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

In accordance with the present invention, a TV broadcasting signal is spread with a predetermined spreading code (or a Walsh code) and sent using a separately prepared broadcasting frequency. Then, an MS receives the TV broadcasting signal without a call set-up. The spreading code is a Walsh code used for an SCH at 153.6 Kbps in IMT-2000 here. A channel on which TV broadcasting is provided is called a broadcasting channel ("BCH").

Figure 1:
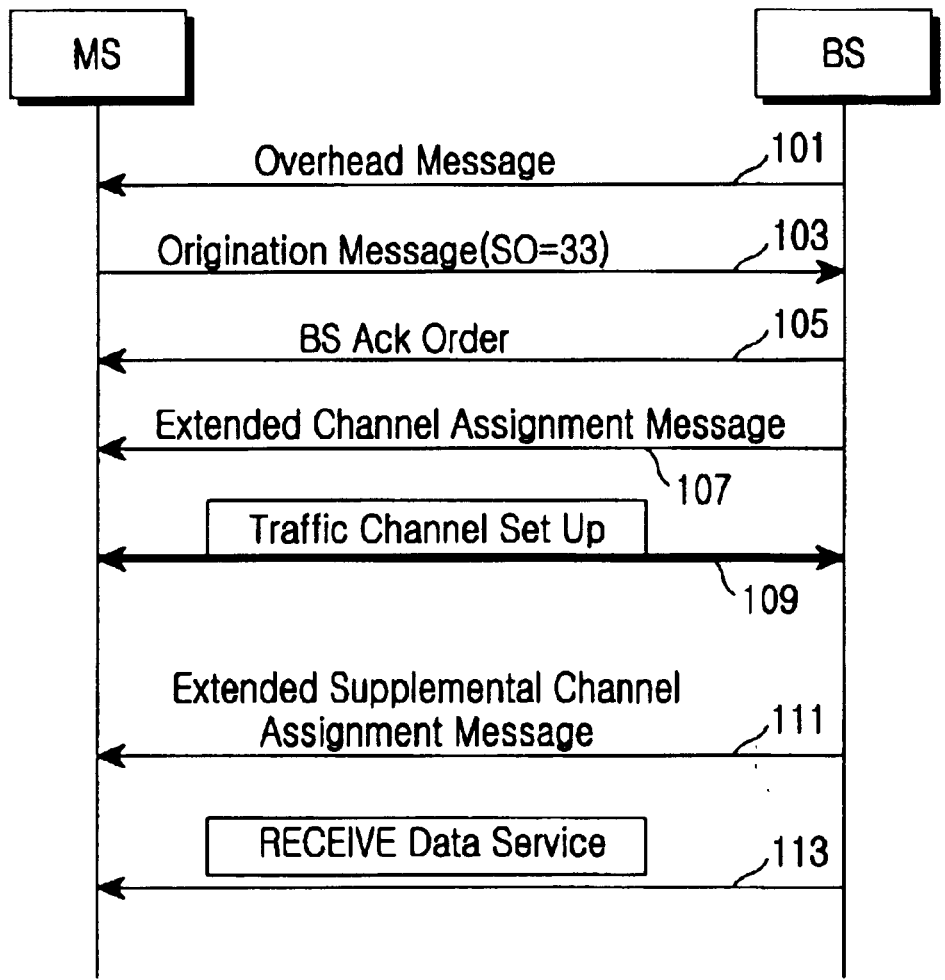
FIG. 1 is a diagram illustrating a signal flow for establishing an SCH in a conventional mobile communication system.
Figure 2:
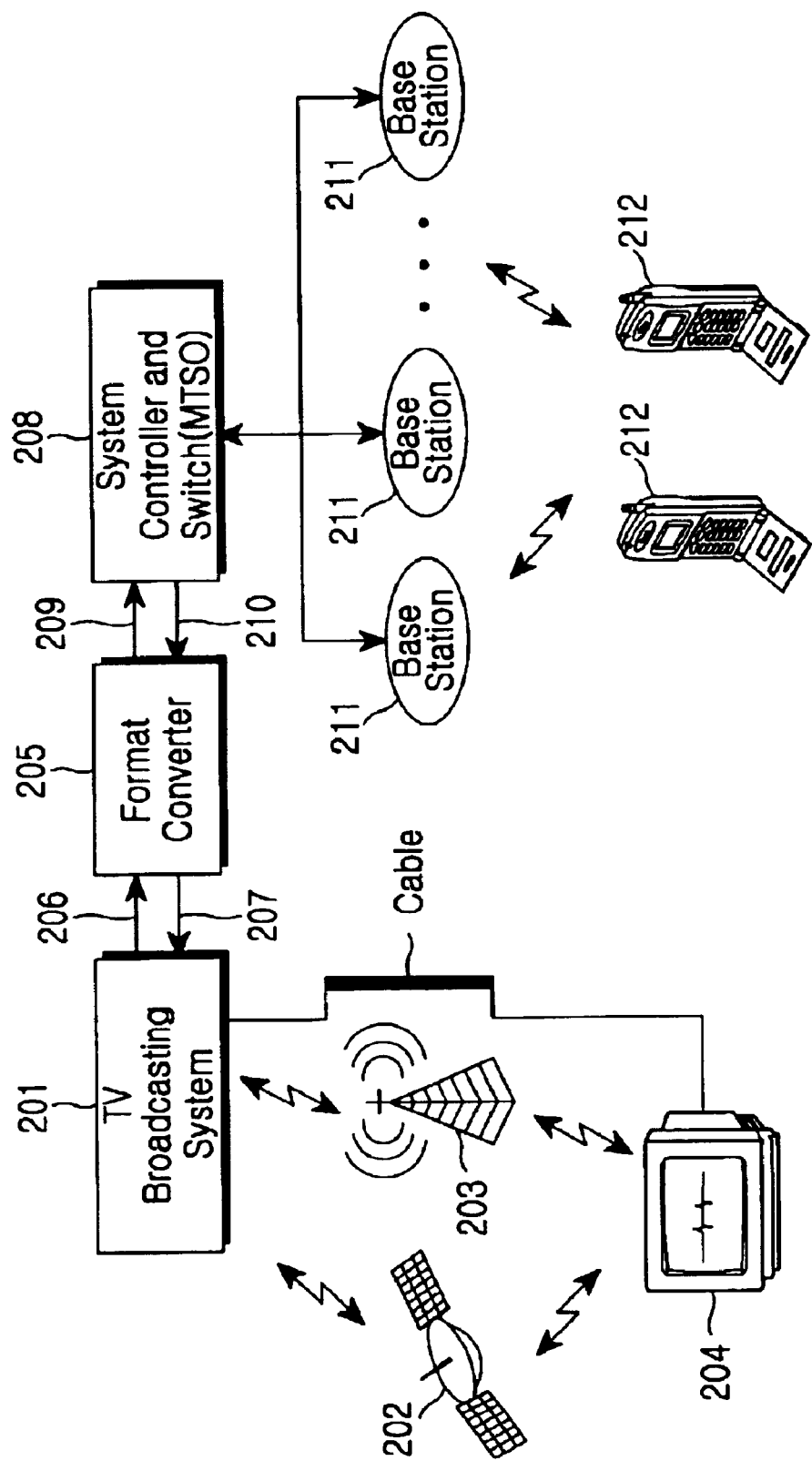
FIG. 2 is a schematic block diagram of a whole mobile communication system for providing broadcasting service according to the present invention.

FIG. 2 is a schematic block diagram of a whole mobile communication system for providing broadcasting service according to the present invention. Referring to FIG. 2, a TV broadcasting system 201 sends video and audio signals to a subscriber terminal 204 over a satellite network 202 or a terrestrial broadcasting network 203, or by a cable. The subscriber terminal 204 processes the video and audio signals appropriately and displays them on a monitor. The TV broadcasting system 201 may include analog, digital, or any other moving picture (and voice) resources.

The existing analog broadcasting systems include National Television Systems Committee ("NTSC"), Phase Alteration Line ("PAL"), and Sequential Couleur A Memoire ("SECAM"), and the digital broadcasting systems, Advanced Television Systems Committee ("ATSC") in the U.S., Digital Video Broadcasting ("DVB") in Europe, and Integrated Services Digital Broadcasting ("ISDB") in Japan. The ATSC employs MPEG2 (image compression), Dolby AC3 (voice compression), and 8VSB (transmission standard). The DVB adopts MPEG2 (image compression) and OFDM (transmission scheme). Korea has selected ATSC for terrestrial broadcasting and DSB for satellite broadcasting.

The digital TV broadcasting systems provide video and audio signals in the form of compressed digital data (bit streams) according to protocols defined for transmission and reception. Digital broadcasting information in a format satisfying the protocols contains a variety of additional information such as Electronic Program Guide ("EPG") data as well as audio and video data. Hereinbelow, processing compressed digital video signals will be described by way of example.

If the TV broadcasting system 201 is a digital TV broadcasting system, this implies that its video resources are compressed coded resources according to MPEG2 standards. Therefore, a format converter 205 is required to convert a compressed coded signal to an image format (e.g., MPEG2) suitable for a mobile communication network. On the other hand, if the TV broadcasting system 201 is an analog one, the format converter 205 should function to convert image resources to digital signals and then the digital signals to a predetermined format suitable for the mobile communication network. The format converter 205 is realized within the TV broadcasting system 201 or the mobile communication network, or as a separate system.

The format converter 205 transcodes MPEG2 image resources received from the TV broadcasting system 201 to the MPEG4, H.263. or H.26X format. A determination is made as to which format is to be used depending on the characteristics of the mobile communication network. Thus, formats other than those described above may also be used. For example, the digital TV broadcasting system usually uses a bit rate of about 19.236 Mbps for High Definition ("HD"), or 6 Mbps for Standard Definition ("SD"). However, since a data rate ranging from 2 Mbps (in the case of a pico cell) to 144 kbps is available in IMT-2000, the mobile communication network aiming at data processing at up to 2 Mbps cannot send a digital TV signal directly to a cellular phone, a PCS phone, or an IMT-2000 phone due to different network characteristics.

Accordingly, transcoding is required to convert an MPEG2 digital TV signal to a signal in a format suitable for the mobile communication network. The format converter 205 takes charge of transcoding video and audio data and additionally converts EPG data and other additional information according to standards adopted in the mobile communication network.

An Mobile Telephone Switching Office ("MTSO") 208 receives the converted digital video and audio data via a line 209 and sends them to subscriber terminals 212 via BSs 211. Here, the MTSO 208 is higher layer systems of the BSs 211 (e.g., MSC and BSC). That is, the MTSO 208 converts video and audio signals received from the TV broadcasting system 201 to signals suitable for the mobile communication network and provides the converted signals to the subscriber terminals 212. In this procedure, users view TV broadcasting via their mobile terminals such as cellular phones, PCS phones, and IMT terminals.

Figure 3:
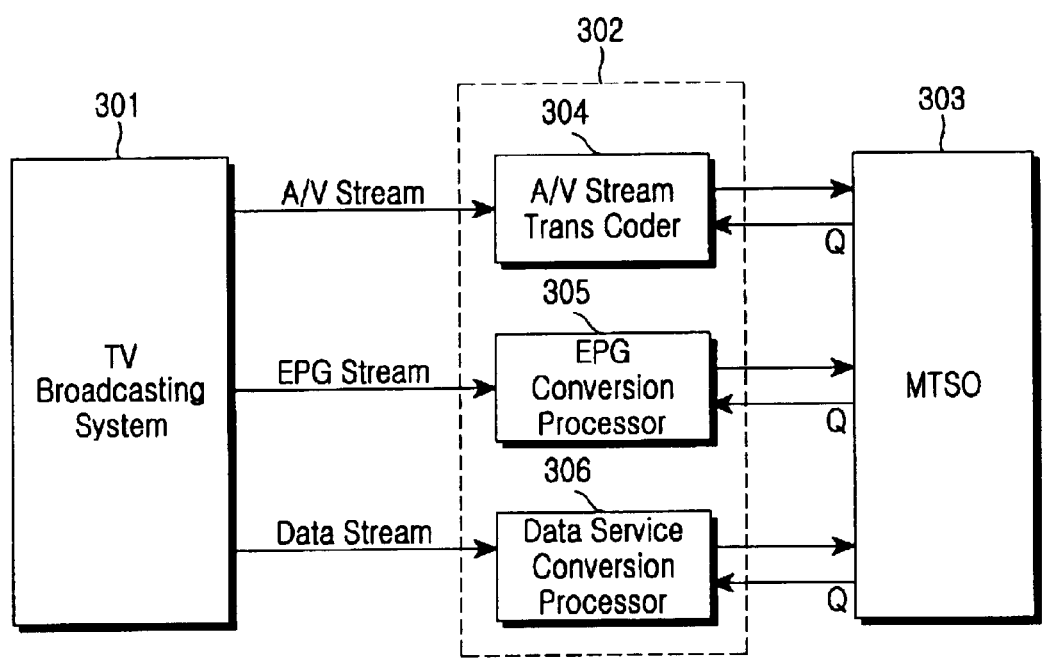
FIG. 3 is a block diagram of a format converter illustrated in FIG. 2.

FIG. 3 is a block diagram of the format converter 205. Referring to FIG. 3, an Audio/Video ("A/V") stream transcoder 304 transcodes an A/V stream received from a TV broadcasting system 301 to a format suitable for the mobile communication network and sends the converted signal to an MTSO 303. The A/V stream transcoder 304 transcodes MPEG2 digital A/V resources received from the TV broadcasting system 301 to an MPEG4, H.26L, H.263, or H.26X format and provides the converted signal to the MTSO 303. An EPG conversion processor 305 decodes MPEG2 EPG data received from the TV broadcasting system 301, transcodes the decoded EPG data to an MPEG4 format, and feeds it to the MTSO 303. The EPG conversion processor 305 decodes the format of EPG information, that is, information from ATSC Program and System Information Protocol ("PSIP") tables, extracts necessary information such as a program name and a bit rate by filtering the decoded EPG information, and subjects the extracted information to contents format conversion in conformance with a radio data protocol. A data service conversion processor 306 decodes MPEG2-based additional data received from the TV broadcasting system 301, transcodes it to the MPEG4 format, and provides the converted data to the MTSO 303.

The TV video data is spread with predetermined Walsh codes and wirelessly broadcast with a dedicated broadcasting frequency in the BS.

Figure 4:
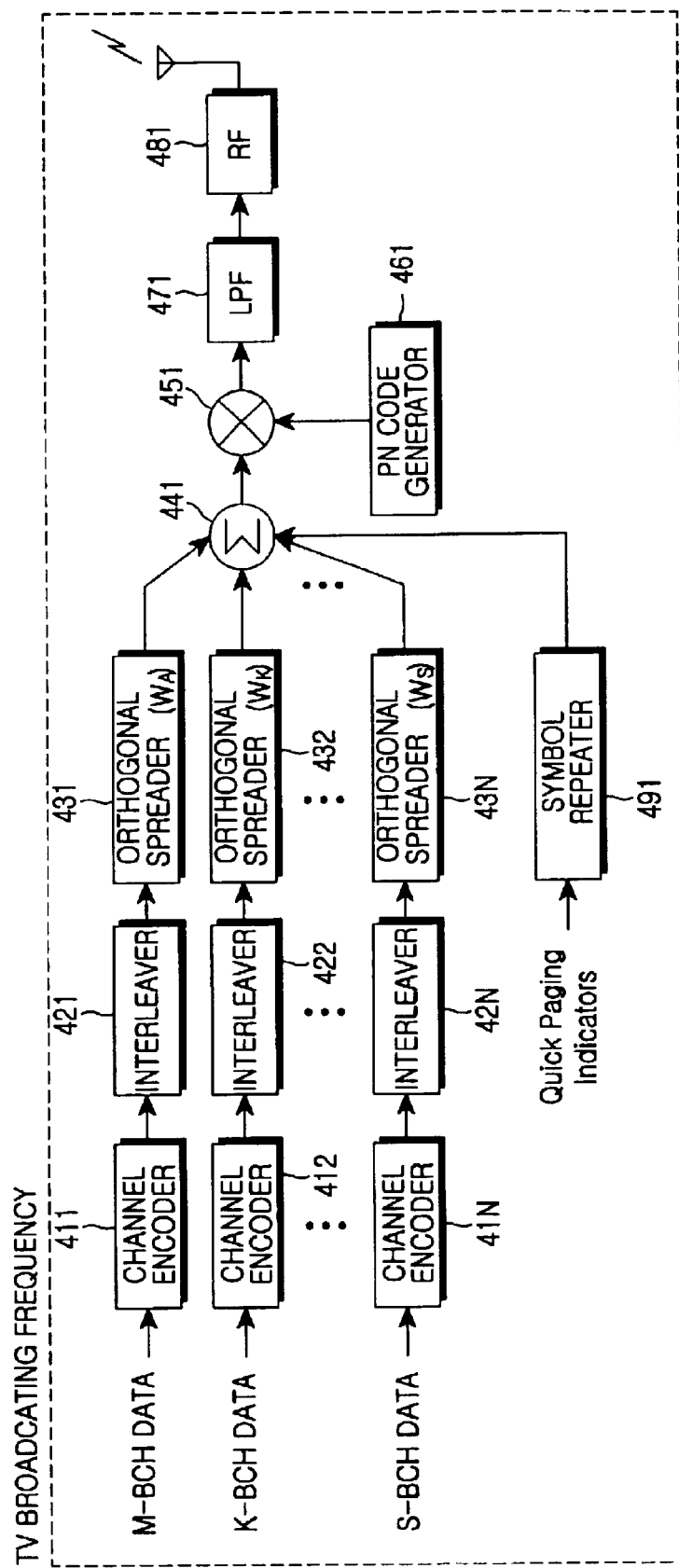
FIG. 4 illustrates a hardware structure related to the broadcasting frequency of a BS according to an embodiment of the present invention.

FIG. 4 illustrates a hardware structure related to the broadcasting frequency in the BS according to the embodiment of the present invention. Since channel transmitters are the same in configuration, one of them will be described by way of example.

Referring to FIG. 4, a channel encoder 411 encodes input M-channel broadcasting data. The channel encoder 411 may be a convolutional encoder or a turbo encoder. An interleaver 421 interleaves coded symbols received from the channel encoder 411 against burst errors. A Walsh spreader 431 orthogonally spreads the interleaver output with a predetermined M-channel broadcasting Walsh code. For example, the Walsh code has a length of 64. A K BCH and an S BCH are processed in the same manner, to thereby produce channel signals for the mobile communication system.

A symbol repeater 491 repeats input quick paging indicators a predetermined number of times (e.g., 2× or 4×) and outputs quick paging signals. An adder 441 sums the outputs of spreaders 431 to 43N and the output of the symbol repeater 491. A Pseudorandom Noise ("PN") code generator 461 generates a PN code by which the BS is identified. A PN spreader 451 spreads the output of the adder 441 with the PN code. A low pass filter ("LPF") 471 low-pass-filters the PN spread signal. A Radio Frequency ("RF") module 481 transmits the output of the LPF filter 471 with a carrier via an antenna.

As described above, the BS uses the dedicated frequency for TV broadcasting and spreads each TV BCH with its dedicated spreading code prior to transmission. For example, the spreading codes are Walsh codes at 153.6 kbps for cdma2000. The spreading codes are known to both the BS and MSs and thus the MSs can receive the TV broadcasting from the BS without any particular notification.

Figure 5:
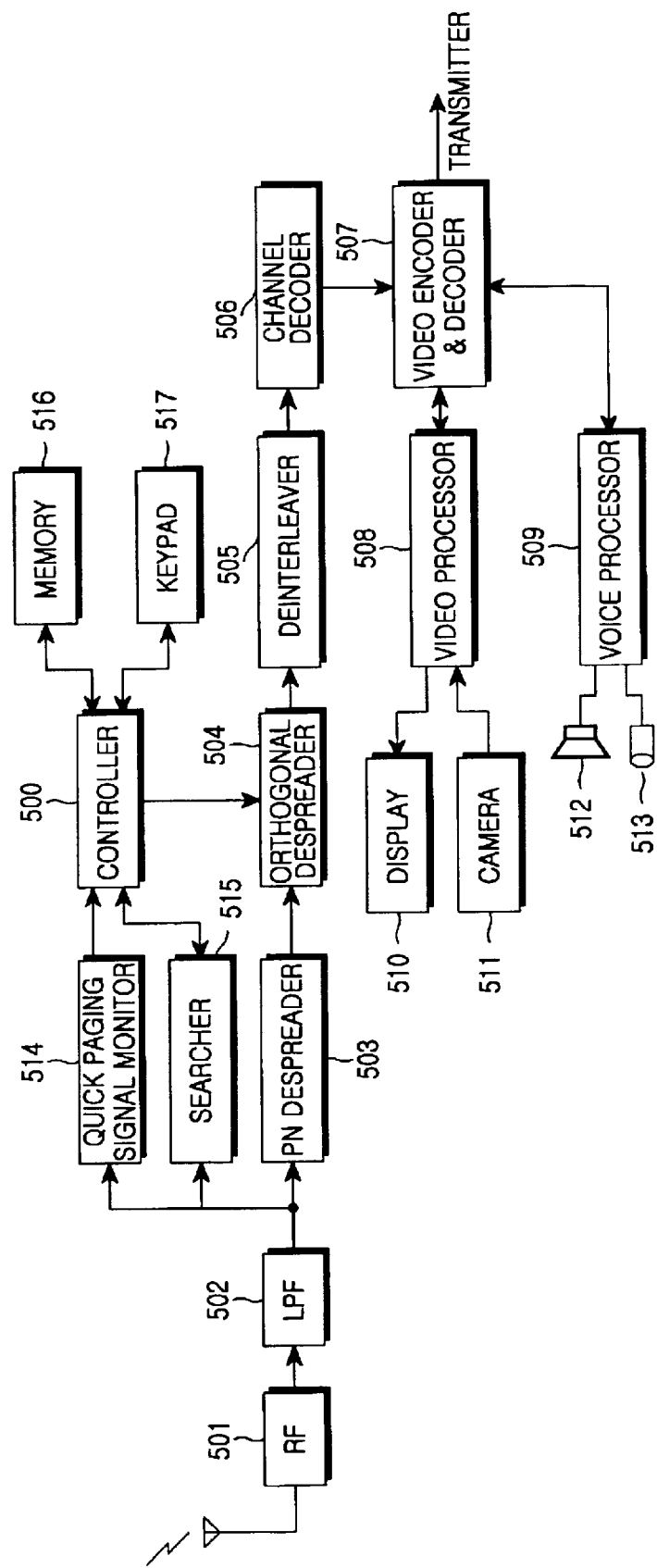
FIG. 5 is a block diagram of an MS for receiving a TV BCH according to the embodiment of the present invention.

FIG. 5 is a block diagram of an MS for receiving a TV BCH. The following description is made on main functional block of the MS.

Referring to FIG. 5, a controller 500 provides overall control to the operation of the MS. A memory 516 includes a program memory, a data memory, and a non-volatile memory. The program memory stores a program for controlling the whole operation of a digital phone. A flash memory may be used as the program memory. The data memory temporarily stores data generated during the operation of the wireless phone. The data memory may be a Random Access Memory ("RAM"). The non-volatile memory stores phone numbers for short dialing and system parameters. An Electrically Erasable Programmable Read Only Memory ("EEPROM") may be the non-volatile memory. A keypad 517 generates command key signals for controlling the operation of the controller 500 and key signals for data input.

An RF module 501 downconverts the frequency of an RF signal containing TV BCH data received from an antenna. An LPF 502 low-pass-filters the output of the RF module 501. A PN despreader 503 multiplies the output of the LPF 502 with a PN code received from a searcher 515, for PN despreading. A Walsh despreader 504 orthogonally despreads the PN-despread signal with a Walsh code corresponding to a user-selected TV channel. A deinterleaver 505 deinterleaves the output of the Walsh despreader 504 in the reverse operation of interleaving performed in the transmitter. A channel decoder 506 decodes the deinterleaver output and outputs video data of the TV channel. In FIG. 5, video data is shown in the format of MPEG4, H.26L, H.262, or H.26X, for example. Other formats may also be used.

In one aspect, a video encoder & decoder 507 functions as an MPEG4 decoder. It decodes the MPEG4 video data received from the channel decoder 506 and feeds a TV video signal to a video processor 508 and voice data to a voice processor 509. The video processor 508 is connected to a display 510 and a camera 511 and displays the TV video signal on a monitor 510 after a predetermined process, and provides an image photographed by the camera 511 to the video encoder & decoder 507 after a predetermined process. The voice processor 509, connected to a speaker 512 and a microphone 513, converts the Voice data received from the video encoder & decoder 507 to an analog voice signal and outputs it via the speaker 513 after a predetermined process, and outputs voice received via the microphone 513 after a predetermined process.

A quick paging signal monitor 514 wakes up at predetermined time intervals and monitors a quick paging channel under the control of the controller 500. Upon receipt of a quick paging indicator for the MS, the quick paging signal monitor 514 notifies the controller 500 of the reception. Then, the controller 500 tunes the MS to a normal frequency (FA2) and controls related functional blocks to receive a paging message from the BS. When the quick paging indicator is located in the last 5-msec portion of a 80-msec quick paging slot, a 30-msec frame of the paging message may be lost because of time required for the MS to be tuned to a different frequency. In this case, the MS receives the paging message in the next paging slot (5.12 seconds in the case of SI→2).

The searcher 515 monitors the received signal strengths of neighbor BSs to acquire the serving BS under the control of the controller 500. The BS acquisition covers initial system acquisition and acquisition at a handoff. At BS acquisition, the searcher 515 provides the PN code of the acquired BS to the PN despreader 503 to allow the MS to receive signals from the BS. Meanwhile, the searcher 515 searches at a predetermined search rate during TV broadcasting service and implements a handoff independently in the case of a handoff in the same zone. When the MS moves to a different zone, the searcher 514 reports the MS's movement to the BS for system initialization. Since neighbor BSs supporting broadcasting service is grouped into the same zone, a handoff in the same zone refers to a handoff to another BS registered in a broadcasting service supporting BS list included in an Overhead Message received at the initial system acquisition. In this case, the searcher 515 performs the handoff without reporting to a higher layer.

As described above, the BS provides TV broadcasting using a plurality of dedicated code channels for TV broadcasting and the MS receives user-selected TV broadcasting using a spreading code corresponding to the TV broadcasting. This procedure is illustrated in FIG. 6.

Figure 6:
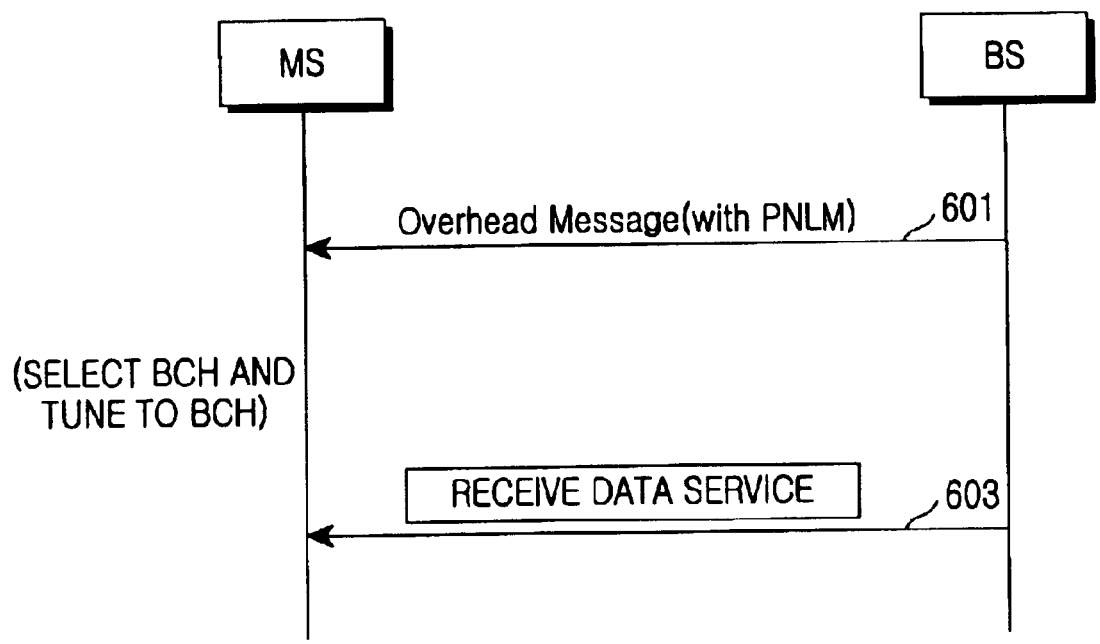
FIG. 6 is a diagram illustrating a procedure for receiving data on a dedicated BCH in the MS according to the embodiment of the present invention.

Referring to FIG. 6, the BS sends an Overhead Message containing a neighbor BS list that supports broadcasting service in step 601. The MS can determine which BSs support the TV broadcasting from the Overhead Message. In step 603, the BS broadcasts TV BCHs with a predetermined dedicated broadcasting frequency using predetermined spreading codes. If the user selects a particular TV channel, the MS is tuned to the dedicated broadcasting frequency and despreads a BCH signal received from the BS. That is, the MS need not perform a set-up procedure to receive the broadcasting signal and uses a dedicated spreading code for the TVG broadcasting. Therefore, all MSs that know the spreading codes can receive the TV broadcasting.

Figure 7:
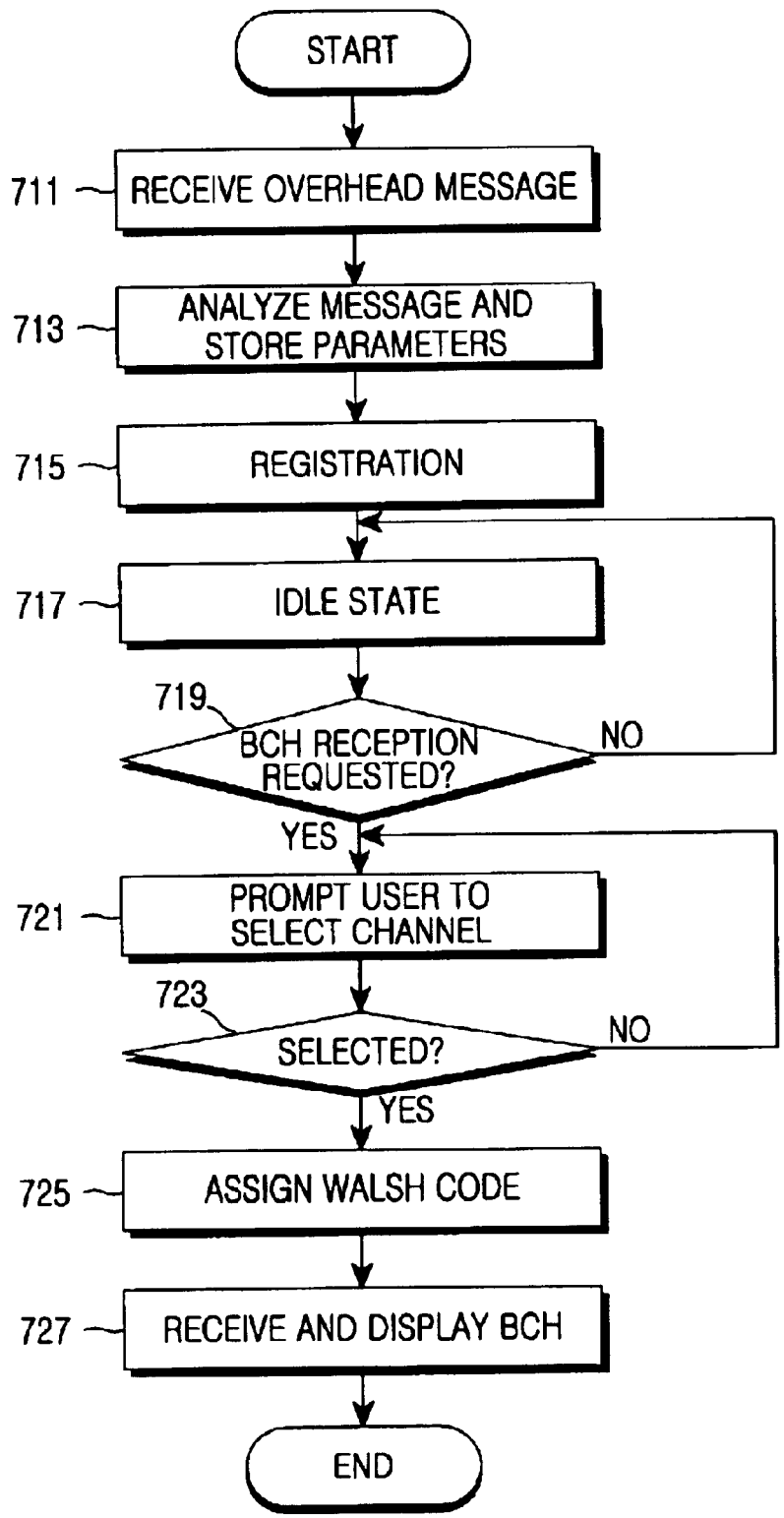
FIG. 7 is a flowchart illustrating a TV BCH receiving procedure in the MS according to the embodiment of the present invention.

FIG. 7 is a flowchart illustrating an MS operation for receiving a TV BCH according to the embodiment of the present invention. Referring to FIG. 7, the MS receives a Sync Channel Message containing basic system information (system identification, network identification, PN sequence offset, long code state after 320 ms, and paging channel data rate) on a sync channel. In step 711, the MS receives Overhead Messages containing system information, system connection information, neighbor base station information, roaming information, and channel information on paging channels. The MS then analyzes the Overhead Messages and stores parameters included in them in the memory 516 in step 713, registers its location in step 715, and enters an idle state in step 717.

In step 719, the MS determines whether the user has requested TV broadcasting. If the TV broadcasting request is detected, the MS prompts the user to select a TV channel through the display 510. For example, the MS displays a list of available TV channels. The MS determines whether the user has selected a particular TV channel in step 723. If the user selected, the MS goes to step 725 and otherwise, it returns to step 721.

In step 725, the MS assigns a demodulator for receiving the selected BCH. That is, the MS prepares for receiving the TV BCH by assigning a Walsh code corresponding to the TV BCH to the Walsh despreader 504. The MS receives the TV BCH and displays it on the display 510 after predetermined video processing in step 727.

As described above, the MS preserves spreading codes for TV BCHs. Upon user request of a particular TV channel, the MS assigns a corresponding spreading code to a demodulator to receive the TV broadcasting. It can be further contemplated as another embodiment that the BS provides the spreading code to the MS at initial system acquisition or call set-up.

Meanwhile, the MS may be enabled to receive a voice call during the TV broadcasting. This may be achieved by quick paging as is known.

Figure 8:
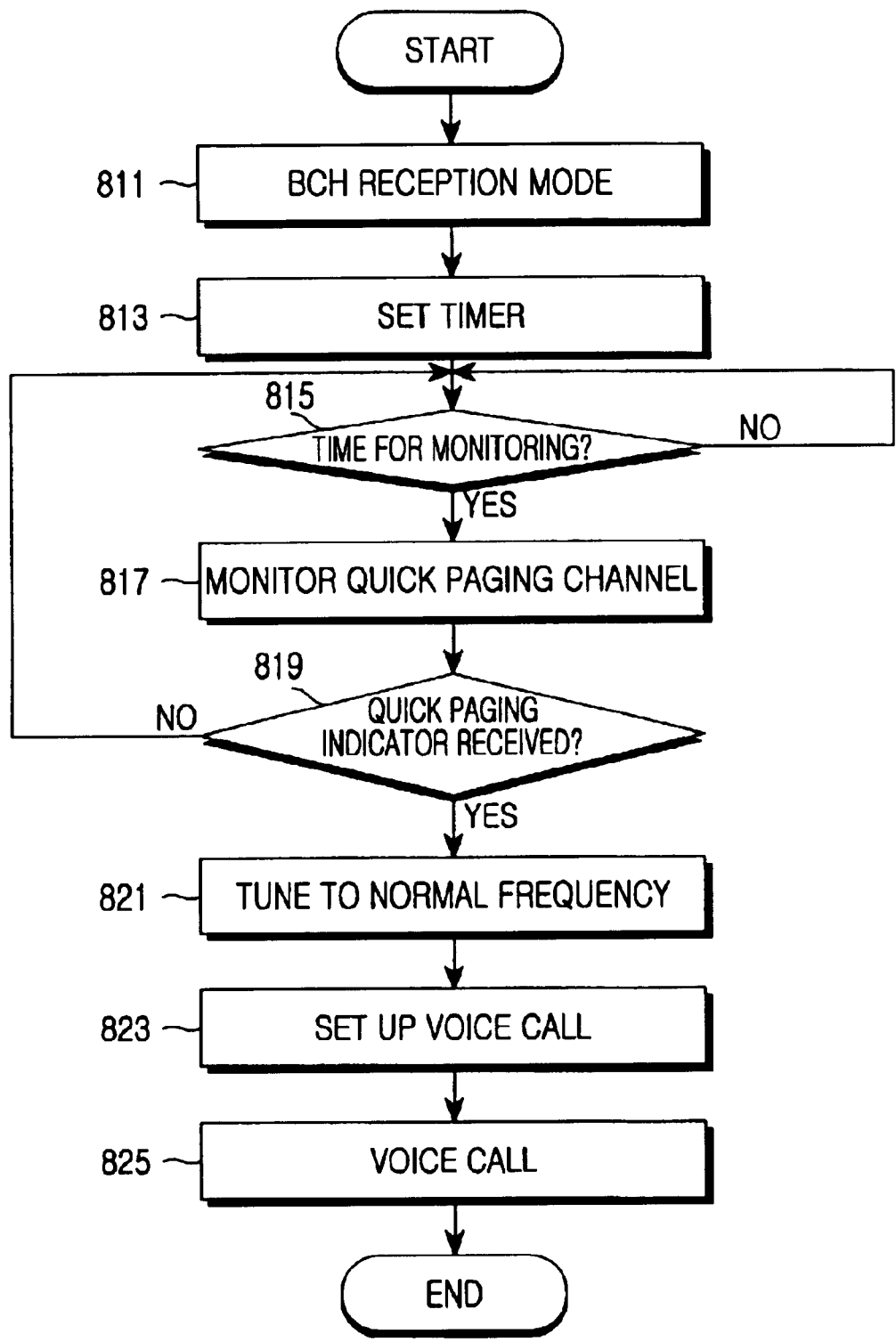
FIG. 8 is a flowchart illustrating a procedure for receiving paging for a voice call during receiving a TV BCH in the MS according to the embodiment of the present invention.

FIG. 8 is a flowchart illustrating an MS operation for receiving a quick paging indicator for a voice call during TV broadcasting. Referring to FIG. 8, the MS is set to a TV BCH reception mode in step 811 and activates a timer in step 813. The timer is set by the quick paging signal monitor 514 to monitor a quick paging signal from the BS periodically. The MS determines whether it is time to monitor the quick paging channel in step 815. If it is, the MS demodulates the quick paging channel in step 817 and determines whether a quick paging indicator for the MS has been received on the quick paging channel in step 189. The time period is defined as a slot index (e.g., 1.28 seconds in the case of SI→0). That is, the MS monitors the quick paging indicator on the quick paging channel every slot index.

Upon receipt of the quick paging indicator, the MS is tuned to the normal frequency and receives a paging message on a paging channel from the BS in step 821. The MS sends a response for the paging message and establishes a traffic channel assigned from the BS for voice communication in step 823. Then, the MS conducts a voice call with the BS on the traffic channel.

The MS monitors the quick paging channel with a TV broadcasting frequency every slot index as described above. Since the MS has already entered a TV broadcasting service zone and registered its location, the system commands all BSs within the TV broadcasting service zone to quickly page the MS and sends paging messages to the BSs, when there is a call for the MS. When the MS determines that a quick paging indicator on the quick paging channel is for the MS, it discontinues reception of the TV broadcasting, is tuned to the normal frequency, and receives a paging message. After a call set-up, the MS conducts a voice call. While the quick paging channel is established with the TV broadcasting frequency in the description, the normal frequency is also feasible. In this case, the MS is tuned to the normal frequency every slot index, monitors the quick paging channel with the normal frequency, and then returns to the TV broadcasting frequency.

A handoff that may occur during receiving a TV BCH falls into the scope of the present invention. Basically, when an MS enters a TV broadcasting service zone, it registers its location, and no registration procedure is performed at an idle handoff in the zone.

Figure 9:
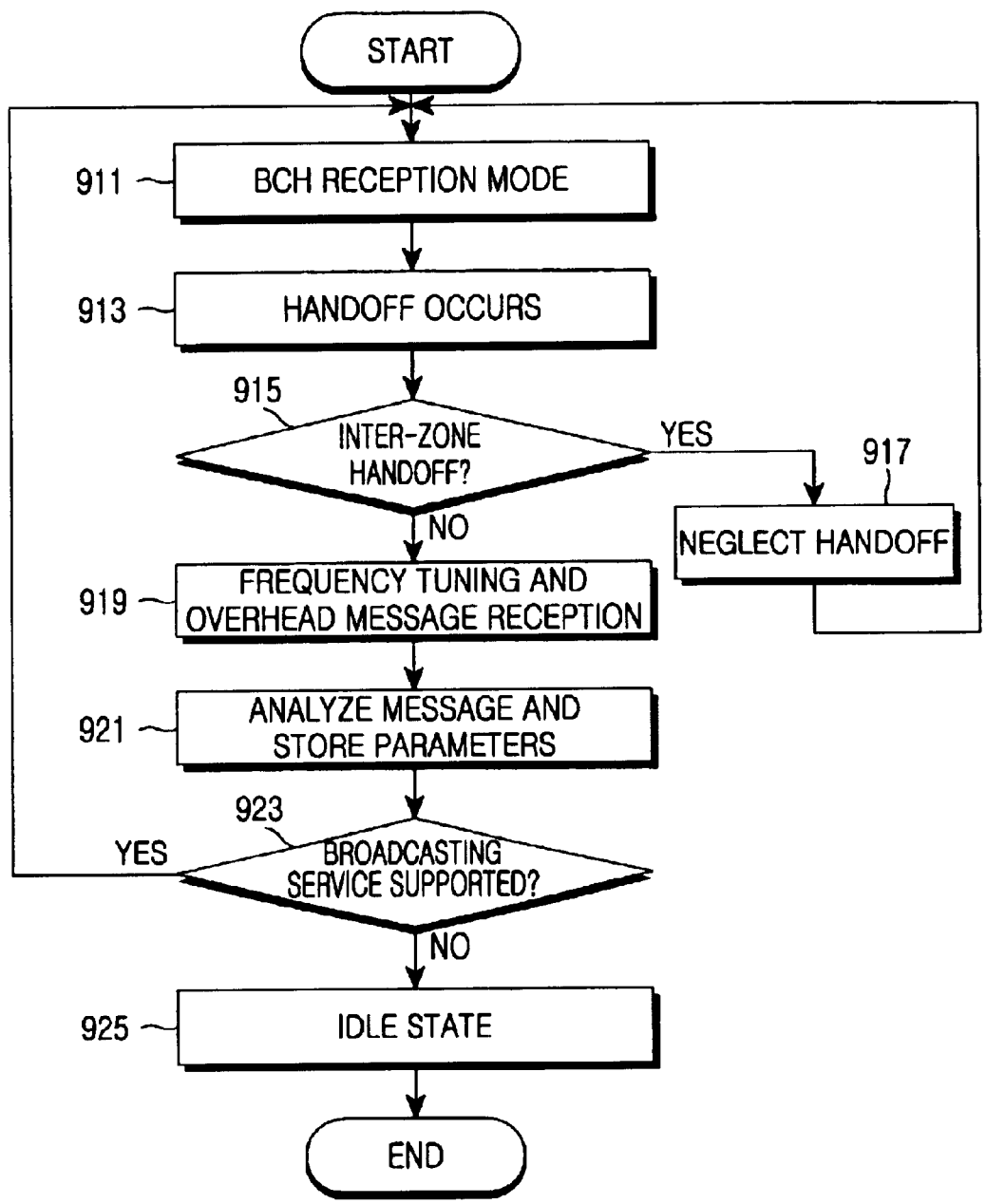
FIG. 9 is a flowchart illustrating a handoff implementing procedure during receiving the TV BCH in the MS according to the embodiment of the present invention.

FIG. 9 is a flowchart illustrating a handoff implementing operation during receiving a TV BCH in the MS. Referring to FIG. 9, the MS enters a TV BCH reception mode in step 911. Upon sensing a handoff occurrence in step 913, the MS determines whether the handoff is an inter-zone handoff in step 915. Here, the zone is defined as the coverage area of a BSC having a plurality of BSs in a mobile communication system. In the case of an inter-zone handoff, the MS does not register its location, neglecting the handoff in step 917 because the BSs within the same BSC have the same system information and thus the MS can continue communications with existing information without registration.

On the other hand, if the handoff is not an inter-zone handoff, the MS is tuned to the normal frequency of a new BS and receives an Overhead Message on a paging channel in step 919. In step 921, the MS analyzes the Overhead Message and stores parameters included in the message in the memory 516 in step 921. Then, the MS determines whether the new BS supports the TV broadcasting service, that is, the new BS is included in a neighbor BS list in step 923. The neighbor BS list is made using a known Private Neighbor List Message ("PNLM"), for example.

If the new BS supports the TV broadcasting service, the MS goes to step 911 to continue receiving the TV broadcasting, and otherwise, it enters an idle state in step 925. Here, the MS is tuned to a broadcasting frequency supported by the new BS, assigns a spreading code corresponding to the user-selected TV channel to its demodulator, and receives the TV BCH.

Figure 10:
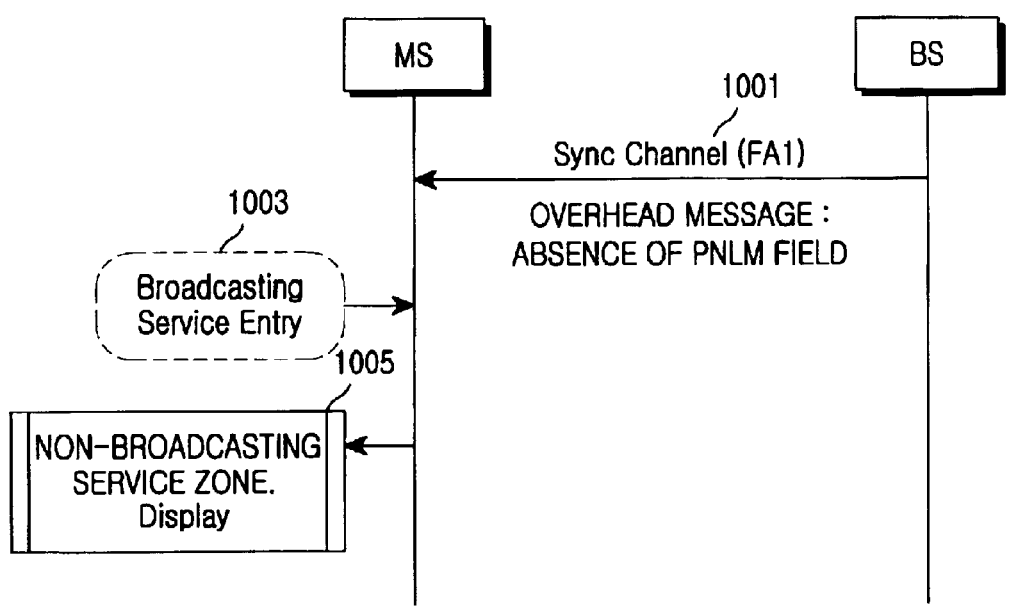
FIG. 10 illustrates a TV BCH receiving procedure in the MS in the case where the MS enters a non-broadcasting service zone according to the embodiment of the present invention.

FIG. 10 illustrates a TV BCH reception procedure when the MS enters a non-broadcasting service zone according to the embodiment of the present invention.

Referring to FIG. 10, when power is on, or at initial system acquisition caused by the movement of the MS to another cell, the MS receives an Overhead Message on a paging channel from the BS in step 1001. Here, the Overhead Message does not include a neighbor BS list. That is, the BS does not support the broadcasting service. Then, upon user request of TV broadcasting in step 1003, the MS displays a message indicating that the user is out of a broadcasting service zone on the display 510 in step 1005.

Figure 11A:
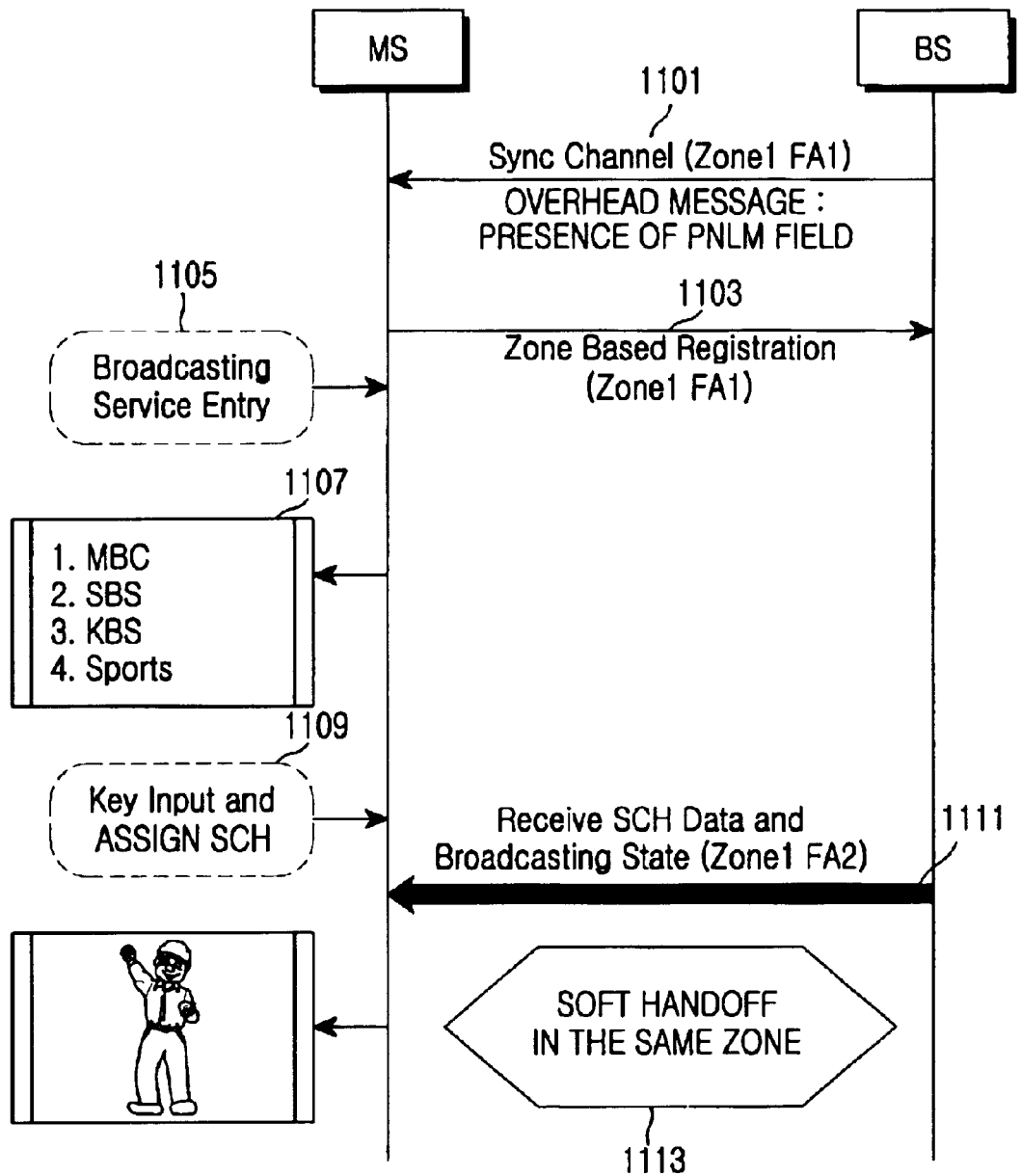
FIGS. 11A and 11B illustrate a handoff implementing procedure during receiving the TV BCH in the MS according to the embodiment of the present invention.
Figure 11B:
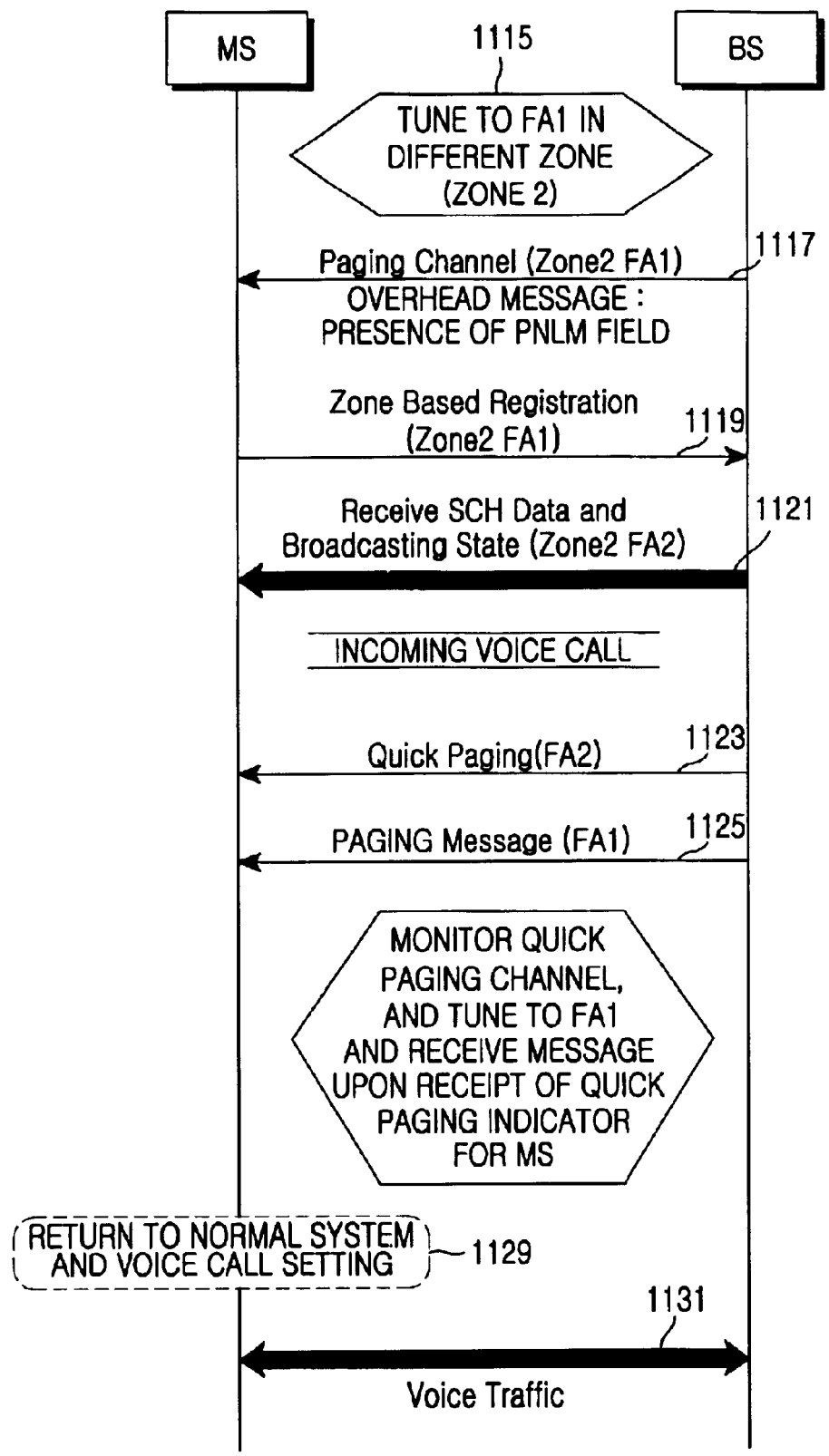

FIGS. 11A and 11B illustrate a handoff implementing procedure during receiving a TV BCH in the MS according to the embodiment of the present invention.

Referring to FIGS. 11A and 11B, the MS receives an Overhead Message containing system information required to communicate with the BS on a paging channel in step 1101. Here, the Overhead Message contains a neighbor BS list. That is, the BS supports the TV broadcasting service. Then, the MS receives a TV broadcasting request from the user in step 1105 and displays a list of TV channels in step 1107. For example, "1. MBC 2. SBS 3. KBS 4. SPORTS" is displayed. The MS senses key input corresponding to the selection of a particular TV channel in step 1109.

The MS then prepares for receiving the TV BCH by assigning a spreading code corresponding to the TV channel to its demodulator. In step 1111, the MS receives the selected TV broadcasting on a BCH from the BS. Here, if an inter-zone handoff occurs during the TV broadcasting, the searcher 515 performs a soft handoff independently. If the broadcasting frequency of the old BS is different from that of a new BS, a hard handoff is performed. During the hard handoff, the on-going communication is interrupted but the user can receive the TV broadcasting without any particular processing.

Then when the MS moves to a different zone, the MS is tuned to the normal FA of a new BS in step 1115 and receives and analyzes an Overhead Message on a paging channel from the new BS in step 1117. Here, the Overhead Message includes a neighbor BS list. That is, the BS supports the TV broadcasting service. After storing parameters set in the Overhead Message, the MS accesses the BS using the information and registers its location in step 1119 and is tuned to the TV broadcasting frequency of the BS to thereby continuously receive the TV broadcasting in step 1121.

Upon receipt of paging for a voice call during the TV broadcasting, the MS receives a quick paging indicator on a quick paging channel from the BS in step 1123. Then, the MS is tuned to the normal frequency and receives a paging message on a paging channel in step 1125. In other words, the MS monitors quick paging indicators on the quick paging channel every slot index. If there is a quick paging indicator for the MS, the MS is tuned to the normal frequency and receives a paging message on the paging channel. The MS then establishes channels for the voice call by negotiations with the BS in step 1129 and exchanges voice traffic on the established channels in step 1131.

In accordance with the present invention, a user may view moving pictures over a mobile communication network. That is, he may view a desired TV broadcasting through his mobile terminal. Furthermore, multiple subscribers may receive their chosen TV broadcasting on dedicated BCHs simultaneously.

While the invention has been shown and described with reference to a certain preferred embodiment thereof, it is a mere exemplary application. For example, while a TV broadcasting service is provided with assignment of a dedicated TV broadcasting frequency, a normal frequency is also feasible. Therefore, it will be understood by those skilled in the art that various changes in form and details may be made therein without departing from the spirit and scope of the invention as defined by the appended claims.

What is claimed is:

1. An apparatus for providing broadcasting service in a mobile communication system, comprising:

a format converter for transcoding video data received from one or more video resources to a format suitable for a mobile communication system;

a base station for spreading the transcoded video data with a predetermined spreading code and broadcasting the spread video signal; and a mobile station for receiving and despreading the broadcasting signal from the base station with the spreading codes, wherein the base station includes a quick paging channel transmitter for repeating quick paging indicators a predetermined number of times and outputting the repeated quick paging indicators.

2. The apparatus of claim 1, wherein the base station transmits the video data with an assignment of a dedicated broadcasting frequency.

3. The apparatus of claim 1, wherein the predetermined spreading code is a Walsh code.

4. The apparatus of claim 1, wherein the one or more video resources include a television broadcasting system.

5. A base station device for assigning a dedicated frequency for TV broadcasting, comprising:

a channel encoder for encoding TV broadcasting channel data;

an interleaver for interleaving the encoded data;

an orthogonal spreader for spreading the interleaved data with a predetermined Walsh code corresponding to the TV broadcasting channel;

a quick paging channel transmitter for repeating quick paging indicators a predetermined number of times and outputting the repeated quick paging indicators;

an adder for summing outputs of the orthogonal spreader and the quick paging channel transmitter;

a Pseudorandom noise ("PN") spreader for spreading an output of the adder with a predetermined PN code; and a Radio Frequency ("RF") module for transmitting the PN-spread signal using a dedicated frequency.

6. The base station device of claim 5, further comprising a paging channel transmitter for transmitting an overhead message having a list of neighbor base stations supporting the TV broadcasting.

7. The base station device of claim 6, wherein the overhead message includes a Private Neighbor List Message ("PNLM").

8. A mobile station device for receiving a broadcasting signal that has been spread with predetermined spreading codes and transmitted using a dedicated frequency for broadcasting in a base station, comprising:

an RF module for being tuned to a dedicated frequency and receiving a broadcasting signal from a base station;

a despreader for despreading the received broadcasting signal with a spreading code corresponding to a particular TV broadcasting channel;

a deinterleaver for deinterleaving the despread broadcasting signal;

a channel decoder for decoding the deinterleaved broadcasting signal;

a video decoder for video-decoding an output of the channel decoder; and a quick paging signal monitor for monitoring paging for a voice call from the base station, wherein the output of the video decoder is processed and displayed on a display.

9. The mobile station device of claim 8, wherein the spreading code is a Walsh code.

10. The mobile station device of claim 8, wherein the video decoder is an MPEG4 decoder.

11. A method of receiving a broadcasting signal from a base station in a mobile station, which has been spread with predetermined spreading codes and transmitted using a dedicated frequency for broadcasting in the base station, comprising:

assigning a spreading code corresponding to a particular TV channel to a demodulator in response to a key input indicating a request for broadcasting of a TV channel;

tuning the demodulator to a dedicated frequency and despreading a broadcasting signal from a base station with the spreading code;

displaying the despread broadcasting signal on a display;

periodically monitoring a quick paging channel from the base station and determining whether there is paging for a voice call during receiving the broadcasting signal; and tuning the demodulator to a normal frequency of the base station in response to paging for the voice call, receiving a paging message, and setting up the voice call.

12. The method of claim 11, wherein the spreading code is a Walsh code.

13. The method of claim 11, further comprising:

determining whether a handoff is an inter-zone handoff in a zone where one or more neighboring base stations support a broadcasting service, in response to the handoff occurring during receiving of the broadcasting signal;

implementing the handoff without registration if the handoff is determined to be the inter-zone handoff;

tuning to a normal frequency of a new base station and receiving an overhead message from the new base station if the handoff is determined to be beyond the zone;

determining whether the new base station supports a broadcasting service by analyzing the overhead message;

receiving a broadcasting signal from the new base station if it is determined that the new base station supports the broadcasting service; and entering an idle state if the new base station does not support the broadcasting service.

14. A method of providing TV broadcasting with a dedicated frequency in a base station, comprising:

encoding TV broadcasting channel data and outputting coded symbols;

spreading the coded symbols with one or more predetermined spreading codes corresponding to TV broadcasting channels and generating TV broadcasting channel signals;

generating a quick paging channel signal by repeating quick paging indicators a predetermined number of times;

adding the TV broadcasting channel signals and the quick paging channel signal;

spreading the added signal with a PN code; and transmitting the PN-spread signal using a dedicated frequency.

15. The method of claim 14, further comprising transmitting an overhead message having a list of neighbor base stations supporting a broadcasting service using a normal frequency.

* * * * *